Figure 1:
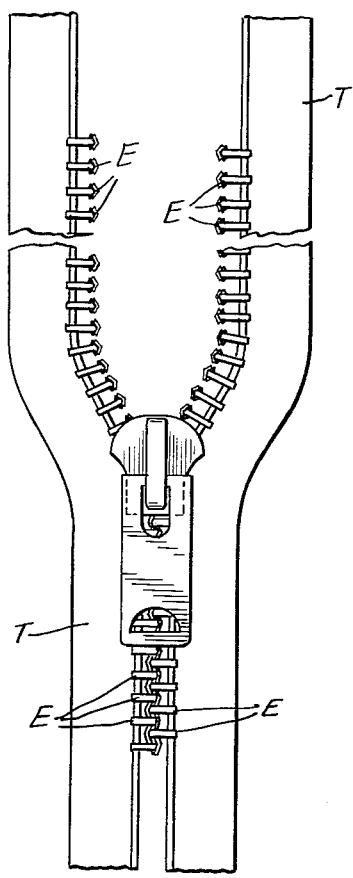

May 28, 1963  R. J. POUX  3,091,024
METHOD OF MAKING FASTENER ELEMENTS FOR SLIDE FASTENERS
Filed Sept. 13, 1960  3 Sheets-Sheet 1

INVENTOR.
ROLAND J. POUX
BY R. E. Meech
ATTORNEY

May 28, 1963 R. J. POUX 3,091,024
METHOD OF MAKING FASTENER ELEMENTS FOR SLIDE FASTENERS
Filed Sept. 13, 1960 3 Sheets-Sheet 2
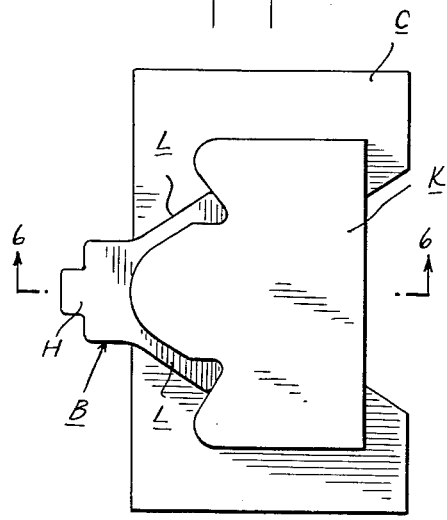
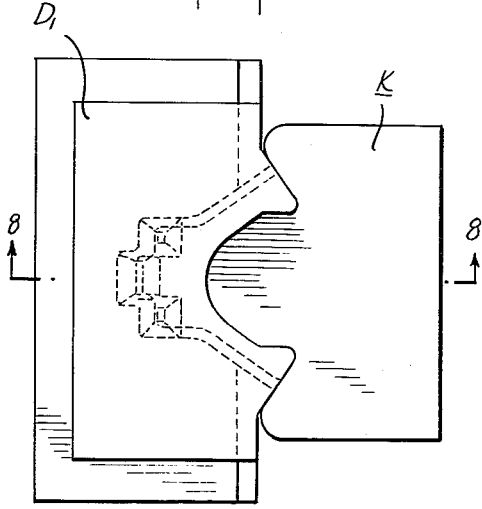
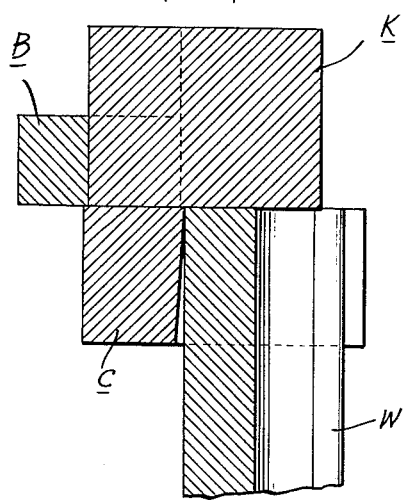
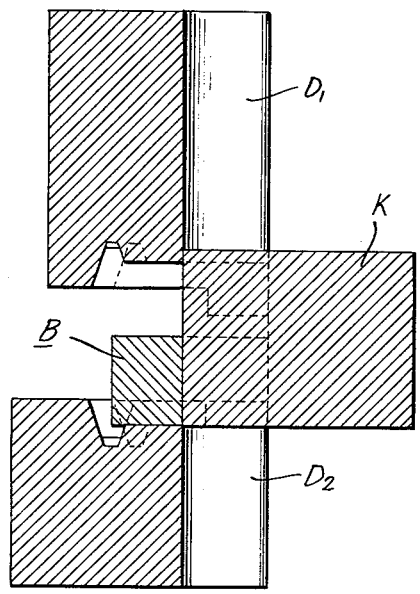
INVENTOR.
ROLAND J. POUX
BY
R. E. Meech
ATTORNEY May 28, 1963 R. J. POUX 3,091,024
METHOD OF MAKING FASTENER ELEMENTS FOR SLIDE FASTENERS
Filed Sept. 13, 1960 3 Sheets-Sheet 3
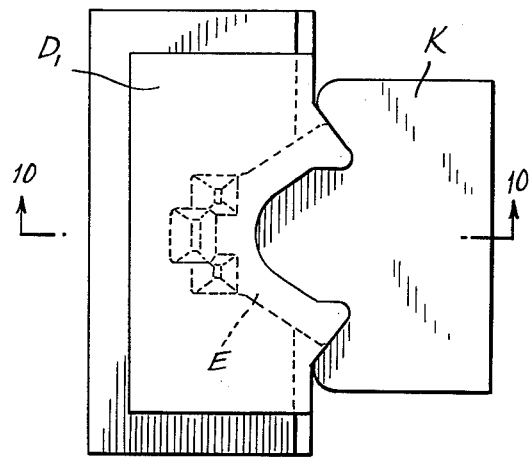
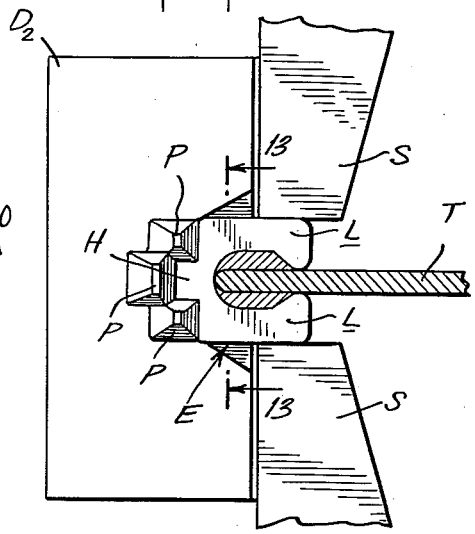
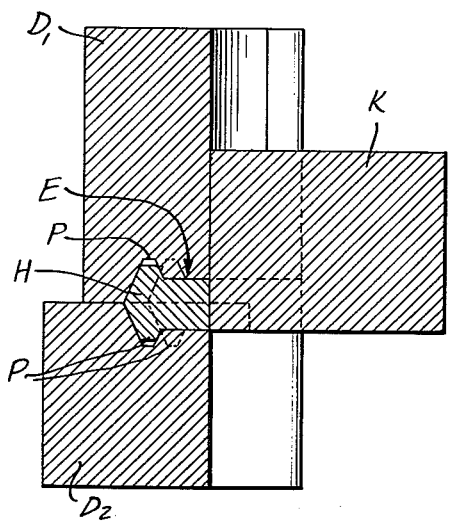
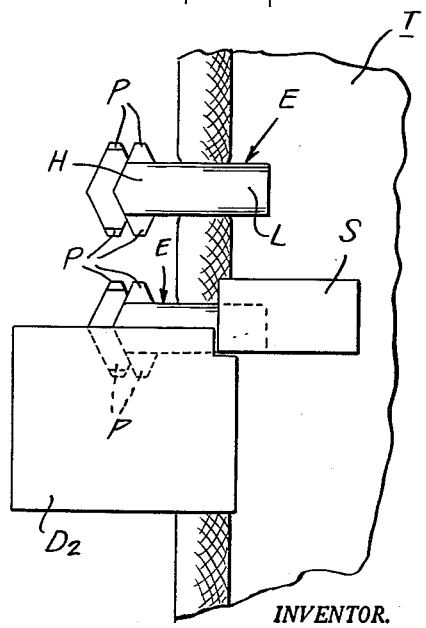
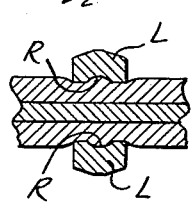
INVENTOR.
ROLAND J. POUX
BY
R. E. Meech
ATTORNEY

United States Patent Office 3,091,024
Patented May 28, 1963

3,091,024
METHOD OF MAKING FASTENER ELEMENTS
FOR SLIDE FASTENERS
Roland J. Poux, Meadville, Pa., assignor to Talon, Inc.,
a corporation of Pennsylvania
Filed Sept. 13, 1960, Ser. No. 55,673
9 Claims. (Cl. 29—410)

This invention relates to the manufacture of slide fasteners, and more particularly to method of making fastener elements therefor.

Heretofore, in the manufacture of fastener elements of the so-called two-way or double acting type, wherein the fastener elements or scoops have common male and female interlocking or coupling portions on each of the aforesaid surfaces thereof, difficulty has been encountered in obtaining sufficient metal in the head portion of the elements to provide consistently satisfactory interlocking portions thereon, particularly if such elements were formed from wire or sheet metal stock. Obviously, if such interlocking portions on the elements are not properly formed with any degree of consistency, an unsatisfactory slide fastener results. While various methods have been suggested and used for forming such fastener elements, they have not been entirely satisfactory and oftentimes, such methods incurred prohibitive tool costs as to maintenance and replacement.

According to the present invention, blanks of material are successively cut from the end of a strip of wire which has been rolled previously to substantially Y-shaped cross section. The thickness of each of these blanks is much greater than the thickness of the finished fastener elements into which they are formed. The blanks are then deformed so as to reduce the thickness of the leg portions thereof, and interlocking portions are simultaneously formed on the head portions which can be easily accomplished by simple and inexpensive dies due to the fact that there is an ample amount of metal in the head portion to be worked.

Accordingly, it is the general object of the present invention to provide a fastener element blank having a thickness much greater than the finished element, swaging the blank so as to reduce the thickness thereof and simultaneously forming thereon interlocking portions.

It is another object of this invention to provide an improved simple and inexpensive method of forming fastener elements which is efficient and effective in its practice and, at the same time, provides consistently a satisfactory fastener element.

Various other objects and advantages of this invention will be more apparent in the course of the following specification, and will be particularly pointed out in the appended claims.

Figure 2:
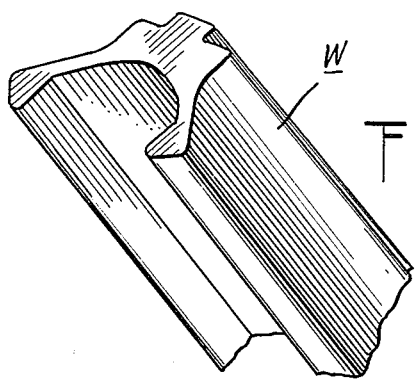

The novel features of this invention will be more readily understood from the accompanying drawings forming a part hereof in which:

FIG. 1 is a plan view of a slide fastener having fastener elements formed in accordance with the present invention incorporated therewith, FIG. 2 is a fragmentary perspective view of the pre-formed wire strip from which fastener elements are formed in accordance with the method of the present invention.

Figure 3:
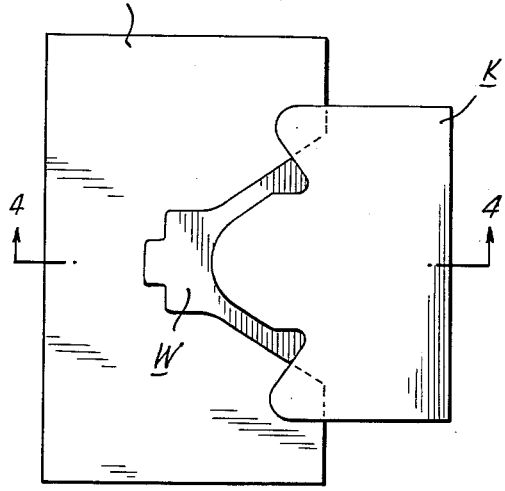
Figure 4:
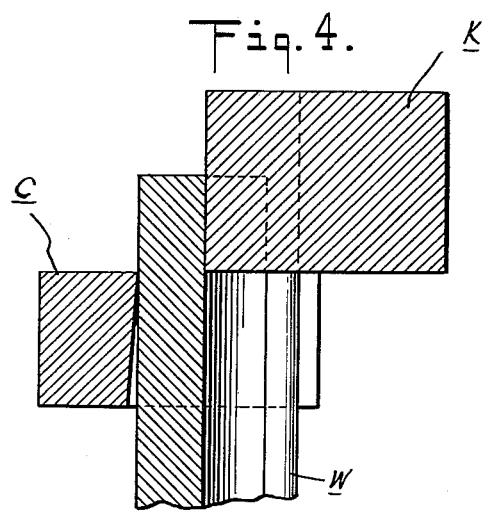

FIG. 3 is a plan view of the cutting knife and die showing the formed wire being fed upwardly therebetween, FIG. 4 is a sectional view taken on line 4—4 of FIG. 3, FIG. 5 is a plan view of cutting knife and die, similar to FIG. 3, showing the cutting knife shearing a fastener element blank from the end of the formed wire strip, FIG. 6 is a sectional view taken on line 6—6 of FIG. 5, FIG. 7 is a plan view of the cutting knife and dies for forming the interlocking head portions on the fastener element blank with a blank shown positioned therebetween, FIG. 8 is a sectional view taken on line 8—8 of FIG. 7, FIG. 9 is a plan view of the cutting knife and dies, similar to FIG. 7, showing the forming of a blank into a fastener element, FIG. 10 is a sectional view taken on line 10—10 of FIG. 9, FIG. 11 is a plan view of the lower forming die and side tools showing a fastener element being attached to the edge of a tape, FIG. 12 is a side elevational view of the lower die and one of the side tools, as shown in FIG. 11, showing fastener elements attached to the edge of the tape, and FIG. 13 is a sectional view taken on line 13—13 of FIG. 11.

Referring more particularly to the drawings, there is shown in FIG. 1, a slide fastener consisting of a pair of tapes T having a series of spaced apart interlocking fastener elements E attached to the opposed beaded edges thereof. These fastener elements E are formed in a manner and attached to the edges of the tapes in accordance with the improved method of the present invention which will hereinafter be described. As shown, there is mounted on the fastener elements a slider having a manipulating or pull member attached thereto for longitudinal movement along the fastener elements for engaging and disengaging the same in a manner well known to those skilled in the art.

Now the method of forming and attaching the fastener elements to the edge of a tape in accordance with the method of the present invention will be described. There is shown in FIGS. 3 and 4 of the drawings, a cutting knife K and cutting die C and between the same, there is shown the upper end of pre-formed wire strip W which has been previously formed by rolling round wire to a substantially Y-shaped cross section, as shown in FIG. 2 of the drawings. This wire strip W is fed upwardly between the cutting knife K and die C by any suitable means (not shown).

Referring now to FIGS. 5 and 6, after the desired thickness of the material to be cut from the wire W is fed upwardly between the cutting die and knife and above the die C, the proper distance, the cutting knife K is actuated by any suitable means (not shown) to cut from the end of the wire strip a proper thickness of material to form a fastener element blank B which is to be formed into a fastener element E. It will be seen that such a blank B consists of a pair of diverging leg portions L interconnected by a head portion H.

After the blank B has been cut from the end of the wire strip W, it is moved forwardly and longitudinally by the cutting knife K to another position between an upper forming die D1 and a lower forming die D2 and held firmly therebetween, as shown in FIGS. 7 and 8 of the drawings. It will be understood that these dies have impressions therein form forming the fastener element of the desired shape and cooperate with one another to form the element.

Now referring to FIGS. 9 and 10 of the drawings, the upper die D1 is actuated by any suitable means (not shown) and the head portion H and leg portions L are formed by the cooperation of this upper die with the lower die D2 to completely form the blank B into a completed fastener element E. In such forming operation on the blank B it will be seen that the thickness of the leg portions L are reduced materially (compare FIG. 8 with FIG. 10). Also, in this forming operation there is formed on the head portion H of the blank preferably three projections P in the present instance, on each side thereof having tapered side walls. It will be seen that two of these projections on each side of the element are positioned adjacent the outer edges of the head portion and that the third portion is positioned forwardly of these two projections and centrally therebetween. Further, in the forming operation the inner walls of the leg portions L are preferably recessed, as at R, as shown in FIG. 13 of the drawings.

After the blank B has been formed into a fastener element E the upper die D1 is moved to a retracted position away from the lower die D2 and this lower die together with the formed element E therein are moved to a position, as shown in FIGS. 11 and 12, so that the leg portions L of the element straddle the beaded edge of a tape T. A pair of side tools S are then actuated to bend the leg portions L around the edge of the tape T to securely attach the element thereto, as clearly shown in FIG. 11 of the drawings.

This completes the forming and attaching of one of fastener element to the tape and it will be understood that the cycle is repeated for forming and attaching successive fastener elements thereto until the desired length fastener stringer is obtained.

As previously explained, the leg portions L of the blank B, as shown in FIG. 8, are flattened and made wider so that the thickness thereof is materially thinner and wider in the finished fastener element E, as shown in FIGS. 10 and 12, but the overall thickness of the head portion at the projections P is substantially equal to the thickness of the original blank B. That is, the thickness of the leg portions L of the blank B are reduced and widened by the action of the forming dies D1 and D2 thereon simultaneously with the deforming of head portion H to form thereon the projections P which is one of the most important aspects of the present invention.

It will also be understood that the longitudinally extending grooves or recesses R on the inner side of each of the leg portions L is formed simultaneously with this forming operation due to the cooperation of the forming dies D1 and D2 and the cutting knife K which is positioned between the leg portions L, as shown in FIGS. 9 and 10 of the drawings, which is another important aspect of the invention.

As a result of my invention, it will be seen that there is provided a simple and inexpensive method of forming fastener elements for slide fasteners which is efficient and by which method a most satisfactory and sturdy fastener element is obtained having all of the necessary requisites.

While I have shown and described an embodiment which my invention may assume in practice, it will be understood that this embodiment is merely for the purpose of illustration and description, and that other forms may be devised within the scope of my invention as defined in the appended claims.

I claim:

1. The method of making a slide fastener element which comprises forming a strip of material into a cross section conforming substantially to the contour of an individual fastener element, cutting a blank from the end of the strip so as to provide a blank member having a pair of leg portions interconnected by a head portion, said head portion having a face on opposite sides thereof, reducing the thickness between the upper and lower surfaces of the leg portions thereof, increasing the thickness between the inner and outer surfaces of the leg portions, and simultaneously deforming each face of the head portion so as to provide interlocking portions on each side thereof.

2. The method of making a slide fastener element which comprises forming a strip of material into a cross section conforming substantially to the contour of an individual fastener element, cutting a blank from the end of the strip so as to provide a blank member having a pair of leg portions interconnected by a head portion, said head portion having a face on opposite sides thereof, reducing the thickness between the upper and lower surfaces of the leg portions thereof and simultaneously deforming the head portion so as to provide a plurality of interlocking projections on each reduced side thereof having an over-all thickness substantially equal to the initial thickness of the blank member.

3. The method of making a slide fastener element which comprises forming a strip of material into a cross section conforming substantially to the contour of an individual fastener element, cutting a blank from the end of the strip so as to provide a blank member having a pair of leg portions interconnected by a head portion, said head portion having a face on opposite sides thereof, positioning said blank member between a pair of dies and deforming the blank member so as to reduce the thickness between the upper and lower surfaces of the leg portions thereof and simultaneously forming interlocking means on each face of said head portion.

4. The method of making a slide fastener element which comprises forming a strip of material into a cross section conforming substantially to the contour of an individual fastener element, cutting a blank from the end of the strip so as to provide a blank member having a pair of leg portions interconnected by a head portion, said head portion having a face on opposite sides thereof, positioning said blank member between a pair of dies and deforming the blank member so as to reduce the thickness between the upper and lower surfaces of the leg portions thereof and simultaneously forming interlocking projections on each face of said head portion.

5. The method of making a slide fastener stringer which comprises forming a strip of material into a cross section conforming substantially to the contour of an individual fastener element, successively cutting blanks from the end of said strip so as to provide blank members with each having a pair of diverging leg portions interconnected by a head portion, said head portion having a face on opposite sides thereof, and deforming the blank members so as to reduce the thickness between the upper and lower surfaces of the leg portions thereof and forming interlocking means on each face of said head portion, and finally positioning the formed elements astride the edge of a tape and bending the leg portions therearound and into engagement therewith so that the fastener elements are securely attached thereto.

6. The method of making a slide fastener stringer which comprises forming a strip of material into a cross section conforming substantially to the contour of an individual fastener element, successively cutting blanks from the end of said strip so as to provide blank members with each having a pair of diverging leg portions interconnected by a head portion, said head portion having a face on opposite sides thereof, successively positioning said blank members between a pair of dies and deforming the blank members so as to reduce the thickness between the upper and lower surfaces of the leg portions thereof and simultaneously forming interlocking means on each face of said head portion, and finally moving the formed elements astride the edge of a tape and bending the leg portions therearound and into engagement therewith so that the fastener elements are securely attached thereto.

7. The method of making a slide fastener stringer which comprises forming a strip of material into a cross section conforming substantially to the contour of an individual fastener element, successively cutting blanks from the end of said strip so as to provide blank members with each having a pair of diverging leg portions interconnected by a head portion, said head portion having a face on opposite sides thereof, deforming the blank members so as to reduce the thickness between the upper and lower surfaces of the leg portions thereof and simultaneously deforming each face of the head portion so as to provide a plurality of interlocking projections on each face thereof having an overall thickness substantially equal to the initial thickness of the blank member, and finally positioning the formed elements astride the edge of a tape and bending the leg portions therearound and into engagement therewith so that the fastener elements are securely attached thereto.

8. The method of making a slide fastener stringer which comprises forming a strip of material into a cross section conforming substantially to the contour of an individual fastener element, successively cutting blanks from the end of said strip so as to provide blank members with each having a pair of diverging leg portions interconnected by a head portion, said head portion having a face on opposite sides thereof, successively positioning said blank members between a pair of dies and deforming the blank members so as to reduce the thickness between the upper and lower surfaces of the leg portions thereof and simultaneously forming interlocking means on each face of said head portion, moving the formed element together with at least one of the dies in which it is formed so as to position the leg portions astride the edge of a tape, and finally bending the leg portions around the edge of the tape and into engagement therewith so that the fastener elements are securely attached thereto.

9. The method of making a slide fastener stringer which comprises forming a strip of material into a cross section conforming substantially to the contour of an individual fastener element, successively cutting blanks from the end of said strip so as to provide blank members with each having a pair of diverging leg portions interconnected by a head portion, said head portion having a face on opposite sides thereof, successively positioning said blank members between a pair of dies and deforming the blank members so as to reduce the thickness between the upper and lower surfaces of the leg portions thereof and simultaneously deforming each face of the head portion so as to provide a plurality of interlocking projections on each face thereof having an overall thickness substantially equal to the initial thickness of the blank member, moving the formed element together with at least one of the dies in which it is formed so as to position the leg portions astride the edge of a tape, and finally bending the leg portions around the edge of the tape and into engagement therewith so that the fastener elements are securely attached thereto.

References Cited in the file of this patent

UNITED STATES PATENTS

| | | |
|---|---|---|
| 2,508,782 | Carlile | May 23, 1950 |
| 2,567,914 | Wintriss | Sept. 11, 1951 |
| 2,596,888 | Cohn | May 13, 1952 |